United States Patent
Reddy et al.

(10) Patent No.: US 10,311,376 B2
(45) Date of Patent: Jun. 4, 2019

(54) SYSTEM AND METHOD FOR CREATING BIOLOGICALLY BASED ENTERPRISE DATA GENOME TO PREDICT AND RECOMMEND ENTERPRISE PERFORMANCE

(71) Applicants: Surendra Reddy, San Jose, CA (US); Vamsi Koduru, San Jose, CA (US)

(72) Inventors: Surendra Reddy, San Jose, CA (US); Vamsi Koduru, San Jose, CA (US)

(73) Assignee: QUANTIPLY CORPORATION, San Jose, CA (US)

( * ) Notice: Subject to any disclaimer, the term of this patent is extended or adjusted under 35 U.S.C. 154(b) by 0 days.

(21) Appl. No.: 15/187,650

(22) Filed: Jun. 20, 2016

(65) Prior Publication Data

US 2016/0371591 A1    Dec. 22, 2016

Related U.S. Application Data

(60) Provisional application No. 62/182,463, filed on Jun. 20, 2015.

(51) Int. Cl.
*G06N 5/02* (2006.01)
*G06N 20/00* (2019.01)
*G06Q 10/06* (2012.01)

(52) U.S. Cl.
CPC ............ *G06N 20/00* (2019.01); *G06N 5/022* (2013.01); *G06Q 10/06393* (2013.01)

(58) Field of Classification Search
None
See application file for complete search history.

(56) References Cited

U.S. PATENT DOCUMENTS

| | | | |
|---|---|---|---|
| 2009/0281845 A1* | 11/2009 | Fukuda | G06Q 10/06393 705/7.39 |
| 2013/0080260 A1* | 3/2013 | French | H04H 60/33 705/14.66 |
| 2015/0046251 A1* | 2/2015 | Smith | G06Q 30/0242 705/14.41 |
| 2016/0103918 A1* | 4/2016 | Alekseyev | G06F 3/04842 715/810 |
| 2016/0131388 A1* | 5/2016 | Eiynk | G05B 15/02 707/728 |

* cited by examiner

*Primary Examiner* — Robert A Cassity
*Assistant Examiner* — Michael Zidanic
(74) *Attorney, Agent, or Firm* — Womble Bond Dickinson (US) LLP

(57) ABSTRACT

Briefly described, embodiments of the present invention pertains to a key performance indicator (KPI)-driven digital genome system or framework as well as various systems and methods of use and interaction therewith. Unlike conventional stand-alone KPI applications or pure-play centralized KPI solutions, embodiments of the present invention provide an automated way to codify the organizational objectives, goals, behavior, and motivations by continuously measuring, correlating, and discovering hidden relationships among various metrics, attributes, causal relationships, and networks display genomic findings via business applications without a priori knowledge of machine learning or statistical techniques.

17 Claims, 10 Drawing Sheets

SYSTEM AND METHOD FOR CREATING BIOLOGICALLY BASED ENTERPRISE DATA GENOME TO PREDICT AND RECOMMEND ENTERPRISE PERFORMANCE

PRIORITY

The present patent application claims priority to and incorporates by reference the corresponding provisional patent application Ser. No. 62/182,463, titled, "System and Method for Creating Biologically Based Enterprise Data Genome to Predict and Recommend Enterprise Performance," filed on Jun. 20, 2015.

FIELD OF THE INVENTION

Embodiments of the invention relate generally to enterprise performance prediction system and, more particularly systems and methods consistent to build and enrich the data genome, at least in part, on history data derived from a plurality of data sources; and automated discovery, correlation and scoring of metrics, measures, and key indicators associated with the enterprise performance. This causal network and computed probability scores may be used to improve effectiveness of decisions, customer experience, operational efficiencies, and optimal business outcomes.

BACKGROUND OF THE INVENTION

Welcome to the age of intelligent machines and connected everything. It is a whole new world of consumerism, exploding data and devices, exponentially increasing complexity, and compliance and legal risks driven by data breaches and exposures. The customer voice and business processes now travel at the speed of light. Unpredictability and variety, driven by these evolving consumer and process dynamics found in every area of our daily lives, are the new reality. These driving forces of unpredictability are also rapidly changing new knowledge and insights, human judgment, analysis, elasticity, and the half-life of decisions and intellectual property. To keep customers engaged, educated, and entertained in this environment, business processes need to be executed in continuous real-time in response to rapidly changing customer sentiments and trends.

Moreover, business processes are the central nervous system of the 21st century enterprise. Continuing budgetary and competitive pressures to reduce costs, increase customer experience and engagement, increase operational efficiencies by reducing friction and waste, and increasing pressure to substantially growth their revenue streams have traditionally motivated decision makers in government, business and other organizations to automate their business processes. Computers and other related technology pervade modern business enterprises as well as other organizations. Companies have invested heavily in business process management systems and static dashboards to optimize their operations for a perfect one-way stream: the line of production. Enterprises immensely benefited from optimized processes within command-and-control structures. Over time, business processes have been standardized, outsourced, off-shored, in-sourced, shared, re-out-sourced, and even sometimes ignored, primarily to reduce costs. Today businesses rely on a plurality of performance data derived from traditional data sources like enterprise resource planning (ERP) software, enterprise data warehouses (EDWs), web clickstreams, customer relationship management (CRM) software as well as spreadsheets and other data files. Unfortunately, the gap between the rate at which the data is available and the ability of a business user to make sense of this data is growing rapidly. Moreover, each system provides information on different aspects of a business operation and this information is spread across the organization. Hence, business professionals must expend a large amount of time and energy to consolidate and digest great quantities of data to determine what is important to its business and its future goals or they need to acquire specialized skills to process large volumes of data to make sense out these data.

To solve these problems, management practitioners introduced balanced score cards, key performance indicators (KPIs) to assist executives and decision makers to keep track of the pulse of business and act quickly to take advantage of opportunities to propel business forward toward established goals and objectives. Key Performance Indicators (KPIs) are customizable business metrics utilized to present the status and trends in an organization in an easily cognizable manner. Once a business or other organization defines its mission or objectives, KPIs can be employed to measure progress toward those objectives. In general, each KPI can have a target value and an actual value. The target value represents a quantitative goal or objective that is considered critical to the success of a business or organization. The target value can change over time but is for the most part a stable value. The actual value is the value that fluctuates often based on the actions and performance of a business. Actual values can be compared to target values to determine a business' health or progress toward the target value. KPIs, if properly defined and implemented, provides very powerful tool for business users that they provide a clear description of organizational goals, distill large volumes of data down to a single value that can be utilized to continuously measure business performance and anticipates any trend shifting patterns well in advance or see organization progress toward organization benchmarks.

In actual use, however, the KPIs, its use and its value have been dumbed down in ways that diminish the quality of intelligence we gain from using business analytics. First is the vague and contradictory ways in which the term is applied by technology providers and practitioners. The second issue has to do with the performance part of KPI, which should show how an organization or any of its business processes measures up to expected outcomes. Ideally, upon viewing performance-related metrics or indicators, within seconds an individual should be able to determine what, if any, action should be taken to improve performance, such as discovering what is contributing to the subpar performance or identifying opportunities for improvement. This root-cause level of actions requires examination of different classes of metrics related to performance and can range from people and processes to customers or risk. Understanding the cause and effect of metrics requires knowing and presenting the process and interconnects of how a business operates. Unfortunately most business analytics software merely provides a table of data with no insight on what metric is contributing to the issue. Finally, businesses focused on building point solutions identifying and measuring metrics to monitor and understand enterprise performance, operational efficacy, customer experience, market, customer segmentations to guide their sales and service strategies. As result the power of KPIs to discovering the causal relationships and discovering the new relationships are lost due to fragmented data, complexity of understanding, and specialized skills needed to make sense of data.

SUMMARY OF THE INVENTION

An enterprise data genome and methods for making and using the same are disclosed. In one embodiment, a method for generating an enterprise data genome for an enterprise comprises: identifying key attributes, measures, and thresholds of enterprise entities that influence the financial, operational, and innovational outcomes of the enterprise using the statistical and artificial intelligence methods; extracting and contextualizing these attributes and measures from measured enterprise data; mapping the entities as nodes and relationships between entities as edges; creating contextual relevance scores to entities and relationships as labels; and connecting and automatically extracting and creating ontologies and semantic maps of enterprise entities.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
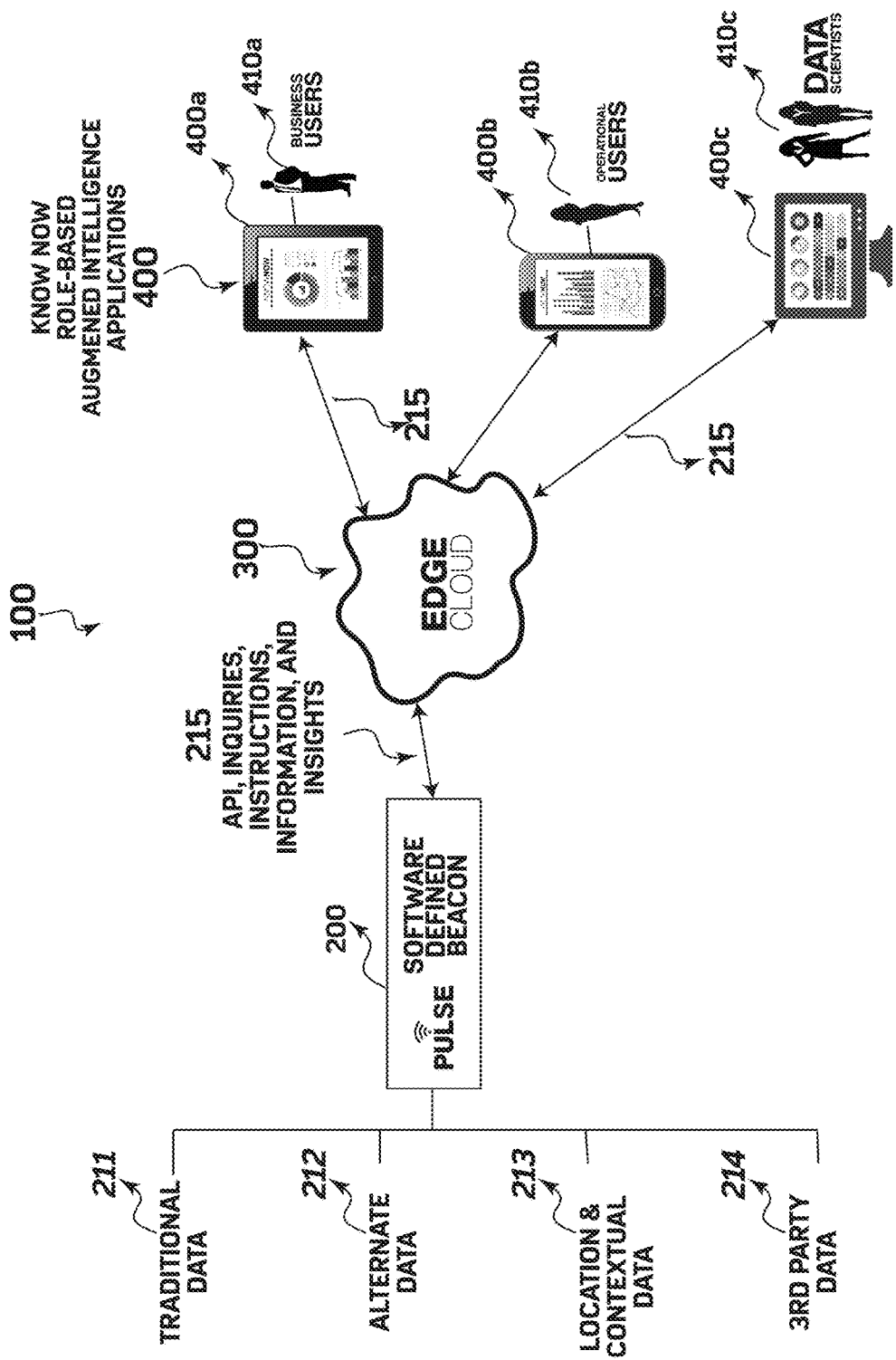
FIG. 1 is a diagram of an exemplary network in which systems and methods consistent with embodiments of the invention may be implemented.

An enterprise digital genome engine and method for using the same to enable enterprises to create the digital map of the enterprises. By creating the relevant metrics underlying key performance indicators (KPIs), enterprises may reduce the time and resources required to support the communications (e.g., email, phone calls and meetings) that people normally use to investigate performance shortfalls. Disclosed embodiments provide a library of measures, metrics and indicators that can cross a variety of situations and help inform action-taking and decision-making, key indicators (KIs) to set a new context that focuses on the indicators and the types of metrics that support them. This could lead organizations to make substantive improvements. Application of an enterprise data genome into organizational decision support systems makes KPIs or KIs relevant to the particular roles and responsibilities of individuals and adds the context of the indicators and metrics at the department, team and individual levels. Disclosed embodiments provide the ability for individuals to select their own focus within the scope of these facts and figures to determine how well their activities are contributing to the execution of business processes and outcomes.

In one embodiment, the enterprise data genome disclosed herein is autonomously built though data points from traditional data sources (for example, through seamless connections to RDBMS and business application systems) and alternate data sources continuously curated and enriched using the elastic cloud technologies along with computed organizational performance indicators that are created through the application of advanced analytics. This derived organic data includes distinctive markers that business leaders could apply to create targeted measures to put their organizations back on track. Existing systems or conventional data processing systems that monitor corporate performance using batch or manual intensive methods fail to capture and exploit such deep insights hidden in the enterprise data. The enterprise data genome disclosed herein employs for autonomous learning, analysis, and prediction of enterprise performance, outcomes of planned initiatives, operational, financial, and product performances; and identifying and recommending next best actions to improve, and potentially optimize, the enterprise performance with reduced or minimal human intervention.

Important features of embodiments of this method include but not limited to:
- The method is efficient in that trillions of bytes of data can be processed in real-time using a small cluster of computers;
- Once the initial parameters are supplied, the method is completely self-learning and autonomous and does not require additional user interaction. This is particularly useful since there may be billions of data feeds and millions of relevant markers makes it impossible for humans to provide any feedback on these relationships or metrics; and
- The method automatically generates hypotheses and tests them utilizing the machine learning and artificial intelligence methods, thereby reducing the human involvement to simple thumbs up and thumbs down reinforcement models.

Businesses that invest in developing customer genomes are most likely to reap these benefits:
- Use data learned from customer genomes to create innovative customer engagement strategies.
- With this new information, businesses can support customers' lifestyles and activities with relevant products and services at the moment a need surfaces. Businesses that achieve this can significantly improve customer engagement efficacy and build deeper brand loyalty.
- Expand point of purchase and cart size: use customer genomes to better understand customer behaviors and purchase decisions, as well as products. Companies can use this knowledge to upsell and influence customers into buying higher-end products, thus increasing cart size. They can also identify genome clusters in order to make relevant recommendations or organize physical or virtual storefronts.

With the enterprise data genome, business users can develop a deeper understanding of their organizational pathologies, develop a deeper understanding of individual customer needs, preferences, and lifestyles delivering truly 1:1 experience. They can also streamline and manage inventory, distribution channels, and identify and optimize their operational, financial, and production efficiencies. Best of all, businesses can use the derived data to convert insights into actions through engaging everyone in the organization delivering the fully connected enterprise vision and developing and delivering contextualized and personalized experiences not only to their customers but also everyone within and outside the enterprise.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

As used in this application, the terms "beacon", "engine", "component", "service", and "system" and the like are intended to refer to a computer-related entity, either hardware, a combination of hardware and software, software, or software in execution. For example, a service may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the present invention may be implemented as a method, apparatus, or article of manufacture using standard programming and/or engineering techniques to produce software, firmware, hardware, or any combination thereof to control a computer to implement the disclosed invention. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the subject invention Machine learning or artificial intelligence based systems (e.g., explicitly and/or implicitly trained classifiers) can be employed in connection with performing learning, reasoning, inference, prediction, and/or probabilistic determinations and/or statistical-based determinations as in accordance with one or more aspects of the subject invention as described hereinafter. As used herein, the term "inference" refers generally to the process of reasoning about or inferring states of the system, environment, and/or user from a set of observations as captured via events and/or data. The term "inference" can be employed to identify a specific context or action, or can generate a probability distribution over states, for example. The inference can be probabilistic—that is, the computation of a probability distribution over states of interest based on a consideration of data and events. "Inference" can also refer to techniques employed for composing higher-level events from a set of events and/or data. Such an inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

Furthermore, the digital genome map is viewed as analogous to that of biological genome and connections leading to a node are like the axons leading to a neuron Like the axons, edges represent signals of varying strength to the neurons or nodes. The arrows leading away from a node are like the dendrites of a neuron, and they carry a signal away from a neuron or node. This data genome structure disclosed herein is not novel but also provides a detailed map of an organizational behavior.

Overview

Briefly described, a KPI-driven digital genome system or framework as well as various systems and methods of use and interaction therewith are described. Unlike conventional stand-alone KPI applications or pure-play centralized KPI solutions, embodiments of the invention provide an automated way to codify the organizational objectives, goals, behavior, and motivations by continuously measuring, correlating, and discovering hidden relationships among various metrics, attributes, causal relationships, and networks display genomic findings via business applications without a priori knowledge of machine learning or statistical techniques.

According to one embodiment, a software defined beacon system is provided for automatically scanning the specified data sources to identify the relevant attributes, metrics, properties, key indicators (KIs) and key measures (KMs) components within the given data source utilizing machine learning techniques like feature selection and correlations combined with the subject matter experts (SMEs) augmented intelligence. Systems are disclosed to facilitate discovery and definition of metadata such as properties, attribute, or elements, some of which are specified as values and set of rules to compute the enterprise genomic structure. Once key components of the genomic structure are defined, it can then be stored in a location (e.g., the cloud at a data source such as a database) for access. According to another embodiment, such an optimized storage can provide for real-time access of system of records, classified genomic markers that influence the outcomes. Ultimate desired outcomes are captured into the system through business user friendly interfaces without any a priori knowledge of artificial intelligence or machine learning tools.

According to another embodiment, a data genome engine is associated with the semantic data source. The data genome engine can execute specified algorithms or functions to identify and score newly identified markers. This can be accomplished by retrieving specified data from the data source, extracting the features from the data sources, and using these features to predict and infer causal relationships. According to an embodiment, a learning, analytics, and prediction engine can be proactive and automatically generate new parameters and models to facilitate real time enrichment of the data genome. Furthermore, the learning, analytics, and prediction engine can automatically create new rules and models, and perform adjustments in order to support newly discovered markers.

According to another embodiment, a cloud based semantic data store is part of a database management system or server remote or proximate to applications that interact therewith. The data genome engine uses efficient storage, management, and security associated with such systems especially in plurality of data structures like graphs, columnar, and row data structures that are all in integrated through the single interface.

According to another embodiment, a method includes determining a measure of how KIs changes over time, generating a score for the KIs, at least in part, on the measure of how the related KIs changes over time, and ranking the correlation among these KIs with regard to at least one other KIs based, at least in part, on the score.

According to another embodiment, a system and method represents organizational entities, attributes, and relationships in one or more digital genome maps. In one embodiment, a digital genome map provides a biological representation of organizational entities, relationships and interactions among those entities. Particular instances of a data genome can serve as a model for a particular industry section and serve as a reference to represent one or more relationships, interactions, and transactions among and between such entities.

According to another element, a method includes: determining a first rate of change in a related attributes or properties of a data genome in a first time period; determining a second rate of change in the content of the KIs in a second time period; comparing the first rate of change and the second rate of change to determine whether there is an increase or a decrease in the rate of change in the content of the KIs; generating a score for the KIs based on relevant attributes computed using any statistical correlation algorithms, at least in part, on whether there is an increase or a decrease in the rate of change in the content of the KIs; and ranking the KIs with regard to at least one other KI based, at least in part, on the score.

According to yet another embodiment, a method includes: receiving a search query; performing a search to traverse the data genome semantic network, at least in part, on the search query to identify a group of search result KIs and dependent attributes, properties, and key measures; determining trends and/or anomalies of the KIs in a set of the search result KIs in the group; determining anomalies and/or trending of the search result KIs based, at least in part, on the determined dates; generating a score for a search result KIs based, at least in part, on a difference between the target values of the search result KIs and the actual values of the search result KIs; and ranking the search result KIs with regard to at least one other one of the search result KIs based, at least in part, on the score.

According to a further embodiment, a method includes: determining a measure of sentiments and mood related to associated comments, customer support notes, reviews, opinions, and any relevant log or text associated with a KI change over time; generating a score for the KI based, at least in part, on the measure of how the attributes, measures, and trends associated with the KI changes over time; and ranking the KI with regard to at least one other KI based, at least in part, on the score.

According to another embodiment, a system determines whether a topic (data narrative) associated with a KI changes over time; generates a score for the KI based, at least in part, on the whether the attributes, metrics, contextual awareness associated with the KI changes; and ranks the KI with regard to at least one other KI based, at least in part, on the score.

In one embodiment, the digital enterprise genome uses traditional data from ERP, CRM systems and alternate data such as, for example, social media profiles and community based data continuously curated and enriched and computed insights, through continuous discovery and enrichment of patterns and insights discovered from these data sets. Examples include inferring future and product service needs or personalizing offers to individual customers as they shop online or via their mobile device. When businesses use the enterprise genome, they can create innovative engagement strategies and can provide a seamless lifestyle experience for that customer in all interactions. This is the next wave of innovation in dynamic enterprise resource planning—one that demands a deeper, more continuous connection with customers and weaves both the brand and products into their everyday lives. As an added step, businesses can move toward selling services that enhance the customer experiences with his/her products and connect the customer to additional purchase opportunities.

FIG. 1 is a diagram of an exemplary network 100 in which systems and methods consistent with the principles of the invention may be implemented, The system 100 provides a framework for development, implementation, and execution of Enterprise Data Genome system 100 can include pulse, a software defined contextual data i.e. identify and gather only relevant data gathering and local learning component 200 and plurality of data sources 210 including traditional data 211, alternate data 212, location and contextual 213, and curated third party data facts, dimensions, census, demographic, psychographic, economic, emotional, and cognitive data 214. A software define contextual gathering component, pulse, 200 can be a generic computer program or computer program product or a smartphone 400a or a tablet 400b as defined herein, including a plurality or executable instructions for performing one or more functions. One of those functions can include pulse, a software defined beacon, in which the processing characteristics of this processes may be created automatically based on the context in which the pulse 200 is operating and facts and dimensions 214 known to the pulse 200 at that point in time. According to the implementation principles of the subject invention, upon connecting to edge cloud 300 using the APIs 215, pulse 200 receives up to data programmatic instructions, information, and insights 215 sent to pulse 200 from edge cloud 300 to execute on the pulse, a software defined contextual data gather component, 200. A pulse 200 component, according to an implementation consistent with the principles of the invention, collects data from the defined data sources 210 and enriches it with the location and contextually relevant data and send the computed data records 215 to the edge cloud 300 via APIs 215. APIs, Inquiry, information, and insights 215 component according to an implementation consistent with the principles of the invention provides simple and uniform semantic interface to query the knowledge and information from the edge cloud 300. Know now role-based augmented intelligence applications 400 are lightweight single page micro applications that may be downloaded from the edge cloud 400 and automatically configured to receive relevant, timely information based on the user profile and roles 410a, 410b, and 410c. Roles 410a, 410b, and 410c listed in 100 are exemplary roles and new roles and permissions may be added through edge cloud 300.

In FIG. 1, data sources 211, 212, 213, and 214 are computer accessible components that provide and/or stores data. Traditional data sources 210 are currently used by many businesses to run their business operations effectively. Examples of this traditional data include, but not limited to, data from internal customer relationship management (CRM), enterprise resource planning (ERP), ecommerce, relational database management system (RDBMS) warehouses and other enterprise systems. These sources yield demographic information, point-of sale transaction details, loyalty card data, customer survey results and more that can be used to start the customer analysis. In addition to traditional data sources available internally within the businesses, wide variety of external data sources, including but not limited to, external traditional third-party customer and market data sources are also available through companies that specialize in providing these services. Options include, but not limited to, Experian Information Solutions, Inc. household, demographic and segmentation data; and Dun & Bradstreet, Inc. business firmographic data. Compiling this information into a single view and running analytics on the dataset will generate the outline of the customer genome: gender, purchase history, birthdate, clothing size, preferences and more.

Alternate data 212 refers to data not commonly used today for segmentation and personalization, as well as data found beyond business borders like social media, community forums and location-based information. Top sources include Facebook, Inc., Twitter, Inc., Pinterest, Yelp Inc., Trip Advisor LLC, third-party product community forums (such as MacRumors.com, LLC.) and other popular consumer sites. Mining these areas for insights, through either social sign-on or web crawling, will help businesses derive insights to better understand the behavior, attitudes and opinions of individual customers.

Location and contextual data 213 is location based, contextually gathered information may computed and generated by the pulse 200 or may be received from the external sources 213. Pulse component 200 may enrich the data collected from traditional data sources 211 and alternate data sources 212 with the location and contextual data 213 implemented according to the principles of the subject invention.

Third party data 214 is indoor tracking technology, including beacon technologies, Wi-Fi triangulation or cell phone signals. Businesses can use this information to understand customer shopping habits or pinpoint micro-location. For example, a grocery store could leverage the data to deliver relevant content and coupons to a customer while he is in the aisle choosing between two brands of food. This is just the beginning of what businesses can do with the customer genome. For example, new options emerge if businesses use product information—traditionally designed only to track inventory—in innovative ways, converting it into a rich source of information by enhancing it with attributes and linking them to customer preferences.

APIs, inquiries, information, and insights component 215 according to an implementation consistent with the principles of the invention is single interface that may be used to send gathered data using secure mechanisms protecting data in transit via interoperable, open secure authentication and authorization standard mechanisms. One exemplary interface according to an implementation consistent with the principles of the invention is representational state transfer (REST) APIs using JavaScript Object Notion (JSON).

Accordingly, traditional data sources 211 can be a computer database residing on a computer readable medium or part of a database management system or server. Data gathered by pulse 200 and is stored in an organized fashion 305 to facilitated search and retrieved of particular data. There are an infinite number of ways to organized data in source 305. According to one aspect of the invention, is organized as a multidimensional database wherein data storage structures include NOSQL data structures 305 comprising dimensions, facts, rules, associations, and measures to name a few. However, it should be appreciated that other types of databases and storage structures are contemplated by and considered within the scope of the present invention.

Figure 2:
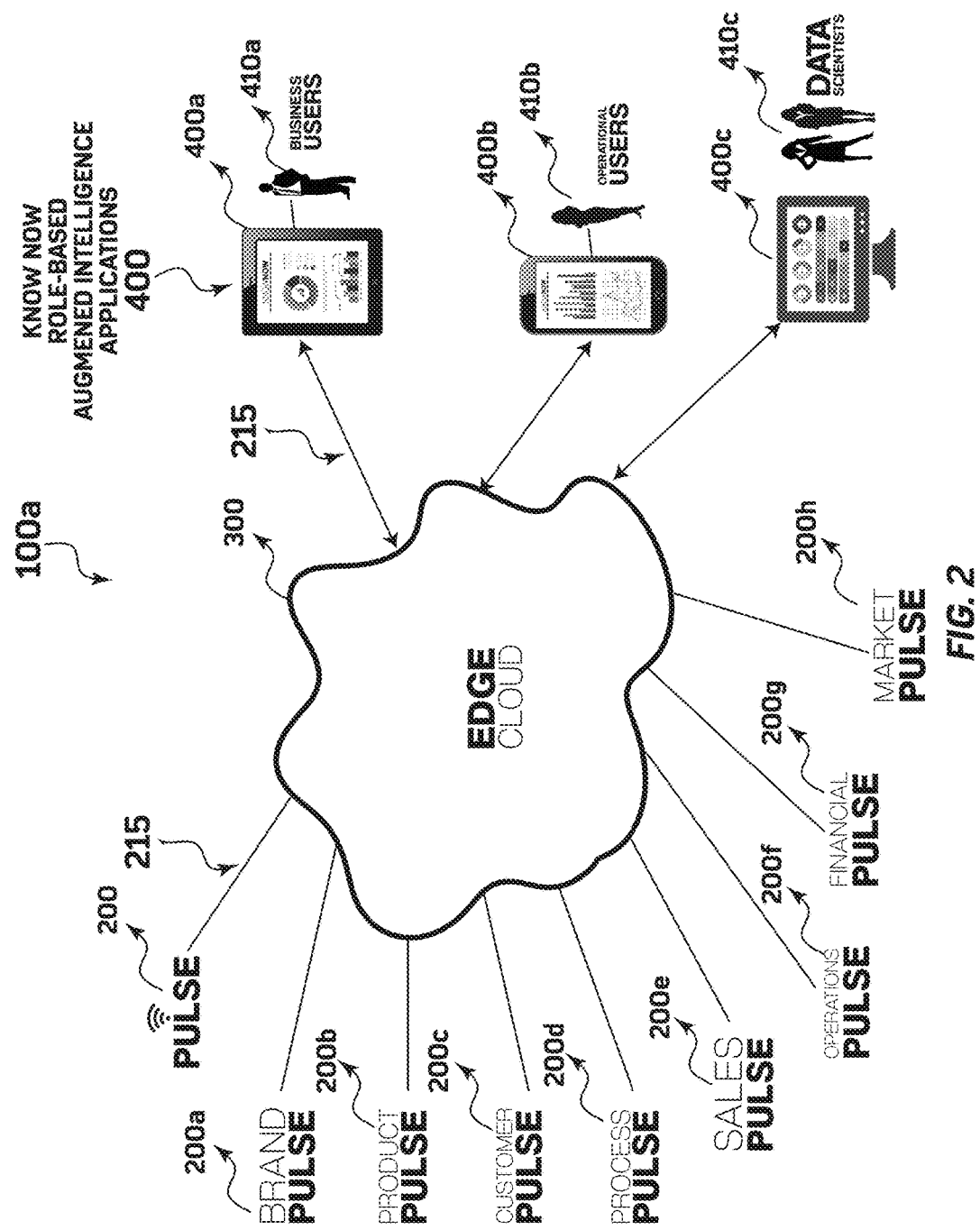
FIG. 2 is a diagram of another exemplary network in which systems and methods consistent embodiments of the invention may be implemented.

FIG. 2 is a diagram of another exemplary network in which systems and methods consistent with the principles of the invention may be implemented. According to one aspect of the invention, pulse component 200 is organized to run on different servers as different avatars 200a-200h to collect relevant and purpose built data gathering instructions delivered from the edge cloud 300. While pulse components 200a-200h are shown as separate entities, it may be possible for one or more of pulse components 200a-200h to perform one or more of the functions of another one or more of pulse components 200a-200h. For example, it may be possible that brand pulse 200a, product pulse 200b, customer pulse 200c, and market pulse 200h are implemented as a single pulse 200. It may also be possible for a single one of the pulse components 200a-200h to be implemented as two or more separate (and potentially distributed) pulse components.

Figure 3:
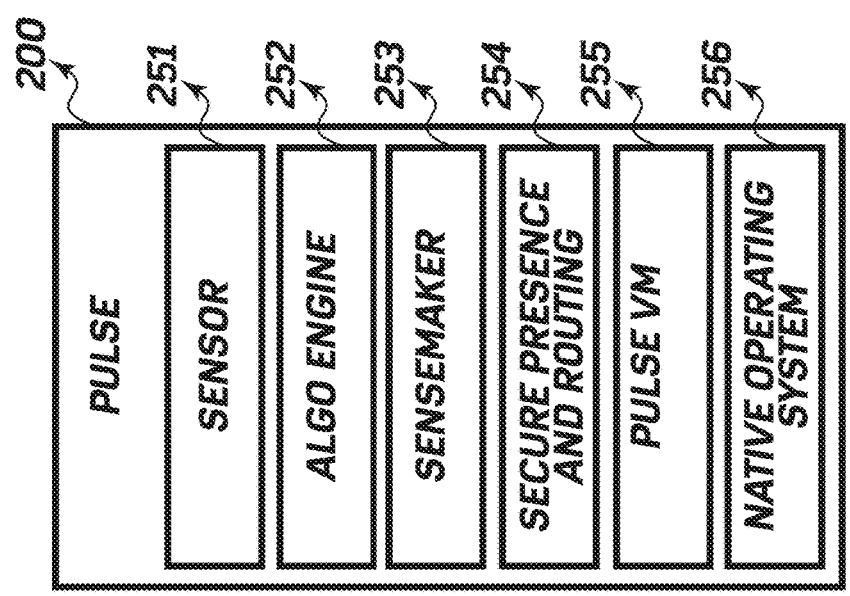
FIG. 3 is an exemplary functional block diagram of the pulse component of FIG. 1 and FIG. 2 according to an implementation consistent with the embodiments of the invention.

FIG. 3 is an exemplary functional block diagram of the pulse component 200 of FIG. 1 and FIG. 2, which may correspond to one or more pulse components 200a-200h, according to an implementation consistent with the principles of the invention. The pulse component 200 may include a data sensor 251, Algorithmic Engine 252, Sensemaker 253, secure presence and routing 254, Pulse VM 255, and native operating system 256. The native operating system 256 may include a computing device 600 that includes, but not limited to, smartphones, tablets, wearable device, computing servers, and cloud servers. In one embodiment, computing device 600 includes one or more conventional processors or microprocessors 601 that interpret and execute instructions. Main memory 602 may include a random access memory (RAM) or another type of dynamic storage device that stores information and instructions for execution by the processor(s) 601. Non-volatile storage 603 stores static information like program code and instructions for use by the processor 601. Storage device 604 may include magnetic and/or flash medium and its corresponding drive. Input device(s) 606 may include one or more conventional mechanisms that permit an operator to input information, such as a keyboard, a mouse, a pen, voice recognition and/or biometric mechanisms. Output device(s) 605 may include one or more conventional mechanisms that output information to the operators, including a display, a printer, a speaker etc. Communication device 607 may include any communication interface that enables the computing device 600 to communicate with the other devices and systems.

Figure 4:
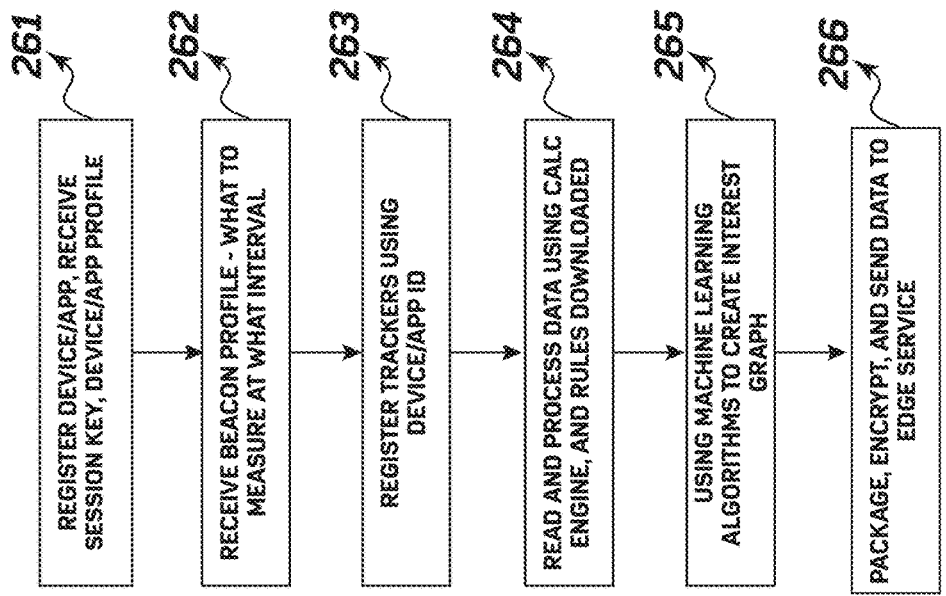
FIG. 4 is a flowchart of exemplary processing for pulse component according to an implementation consistent with the embodiments of the invention.
Figure 10:
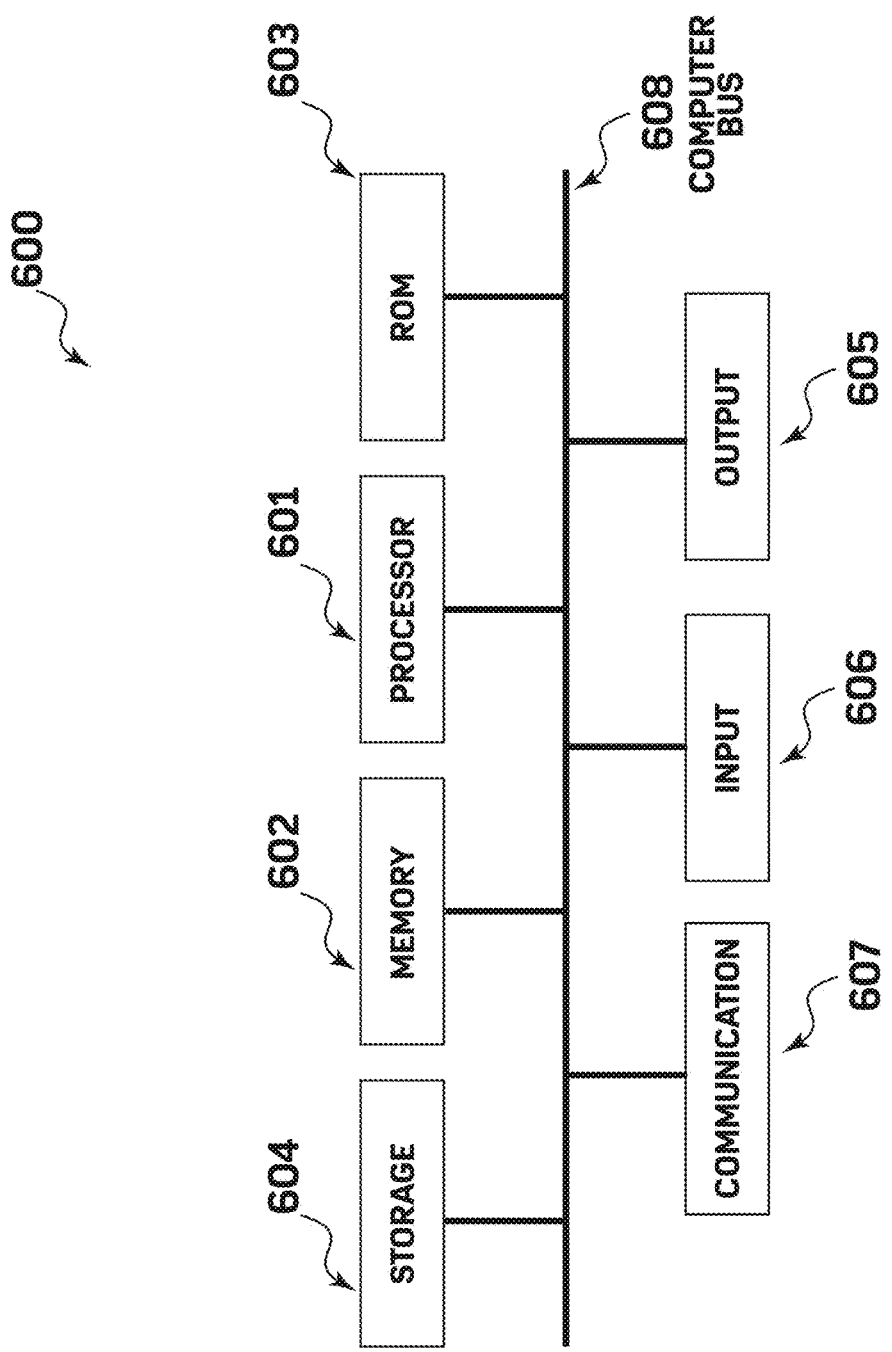
FIG. 10 is an exemplary diagram of a computer device and its components according to an implementation consistent with the embodiments of the invention.

The pulse component 200 consistent with teachings herein performs certain data sensing, processing, and sensemaking operations. Sensemaking operations include inputs confirming relationships and characterizations into the genome. The pulse component 200 may perform these operations in response to computing device 600 shown in FIG. 10 executing the on the processor 601 instructions downloaded from the edge cloud 200 into the computing device 600 memory 602. Consistent with the principles of the invention pulse component 200 perform certain operations as shown in the FIG. 4, functional block diagram of a pulse component 200. As well detailed in FIG. 4, pulse component 200 may perform tasks register device/application, receive session key, and device/application profile 261, receive beacon profile 262 regarding what to measure at what interval, register trackers and sensors 653 using the device application /id, read and process data using the algorithmic engine and downloaded rules 654, using machine learning code downloaded from the edge cloud 300 create the interest graph 655, and finally package, encrypt, and transmit the collected data securely 656 to the edge cloud 300. The computer bus 657 can be any of several types of bus structure(s) including the memory bus, memory controller, a peripheral bus, local bus, or an external bus using any variety of available architectures available including, but not limited to, Peripheral Component Interface (PCI), Universal Serial Bus (USB) etc.

Figure 5:
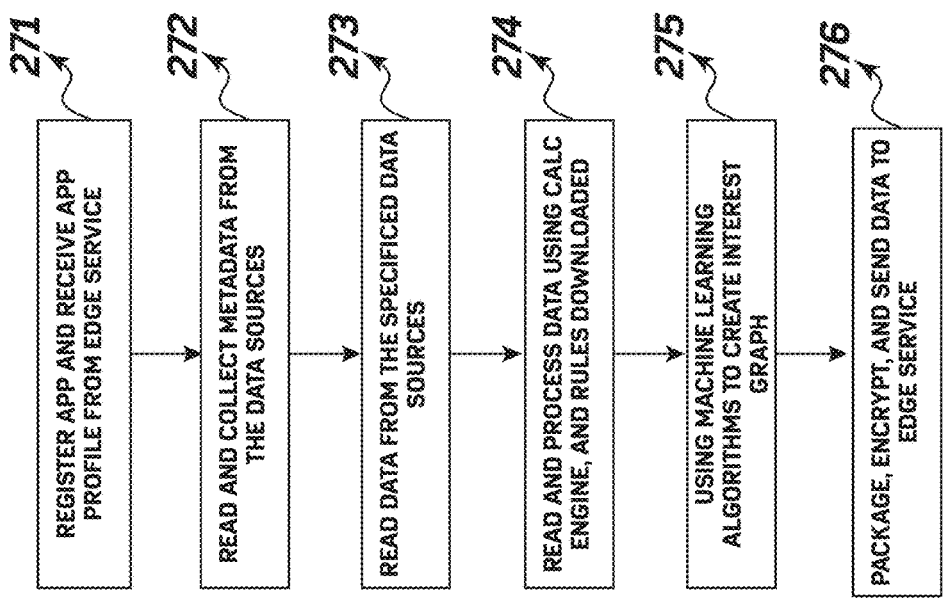
FIG. 5 is a flowchart of an autonomous method for data source selection, extraction, processing, classification, enrichment, and labeling of entities, relationships, rules, associations, attributes, and scores according to an implementation consistent with the embodiments of the invention.

FIG. 5 is a flowchart of an autonomous method for data source selection, extraction, processing, classification, enrichment, and labeling of entities, relationships, rules, associations, attributes, and scores according to an implementation consistent with the teachings herein. In other embodiment, the pulse component 200 autonomously performs the operations outlined in the FIG. 5. These operations include but not limited to register application and receive application profile from the edge service 271, read and collect meta data from the data sources 272, read data from the specified data sources 273, read and process data using algorithmic engine and rules downloaded 274, using machine learning code downloaded from the edge cloud 300 to create interest graph 275, and package, encrypt and send data to the edge cloud securely 276.

Figure 11:
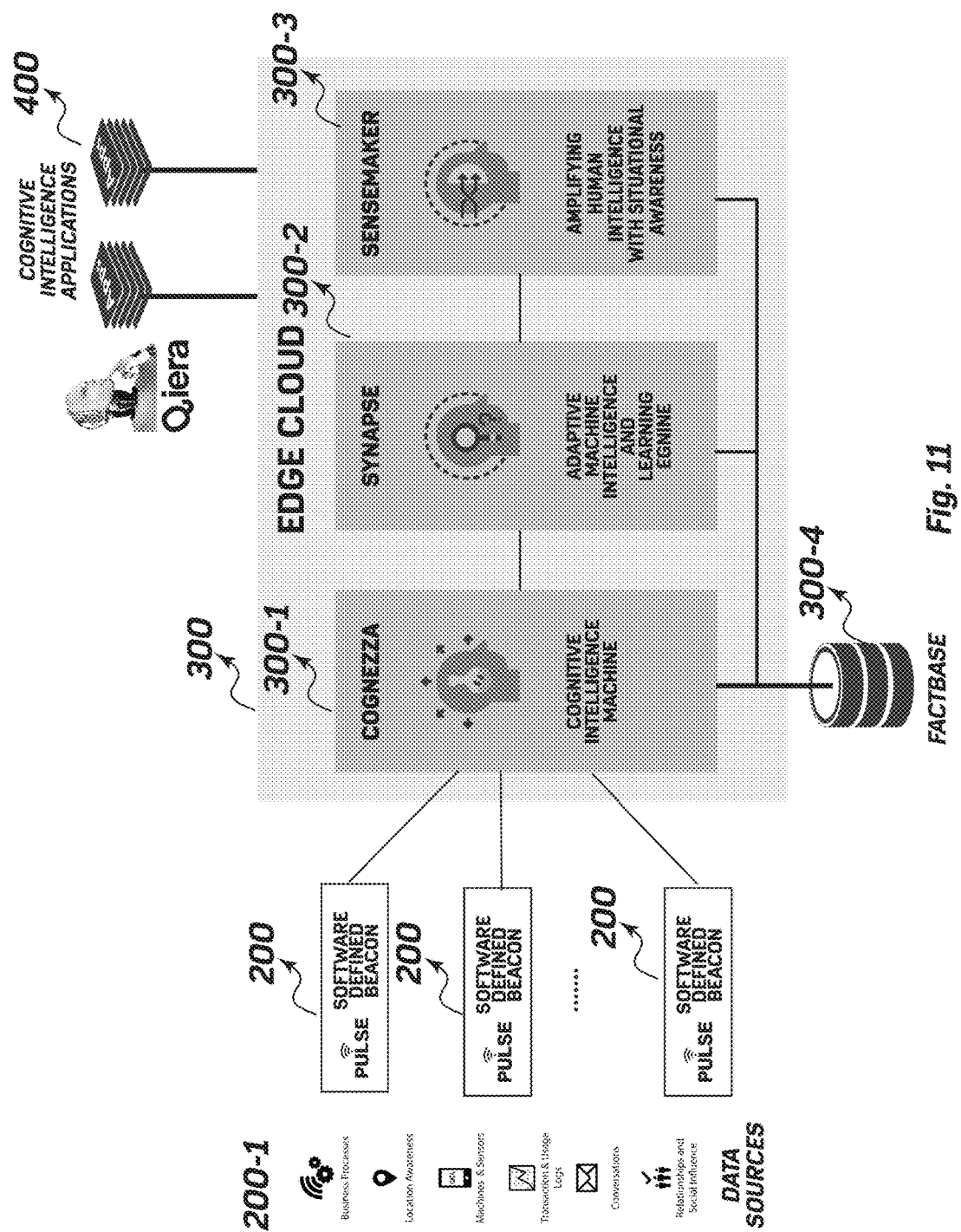
FIG. 11 is an exemplary functional block diagram of the edge cloud component according to an implementation consistent with the embodiments of the invention

FIG. 11 is an exemplary functional block diagram of the edge cloud with subcomponent according to an implementation consistent with the teachings herein. These subcomponents include cognitive intelligence machine 300-1, adaptive machine intelligence and learning engine 300-2, sensemaker 300-3, and factbase 300-4. Factbase 300-4 component stores all facts and dimensions learned via data process, enrichment and prediction process as outlined in the FIG. 6. Factbase 300-4 can be realized using off-the-shelf relational database products or graph data store engines. The Internal processing mechanisms to realize the inner workings of this process is outlined in the FIG. 6. The edge cloud 300 component expose all facts and dimensions via API for creating cognitive applications 400.

Figure 6:
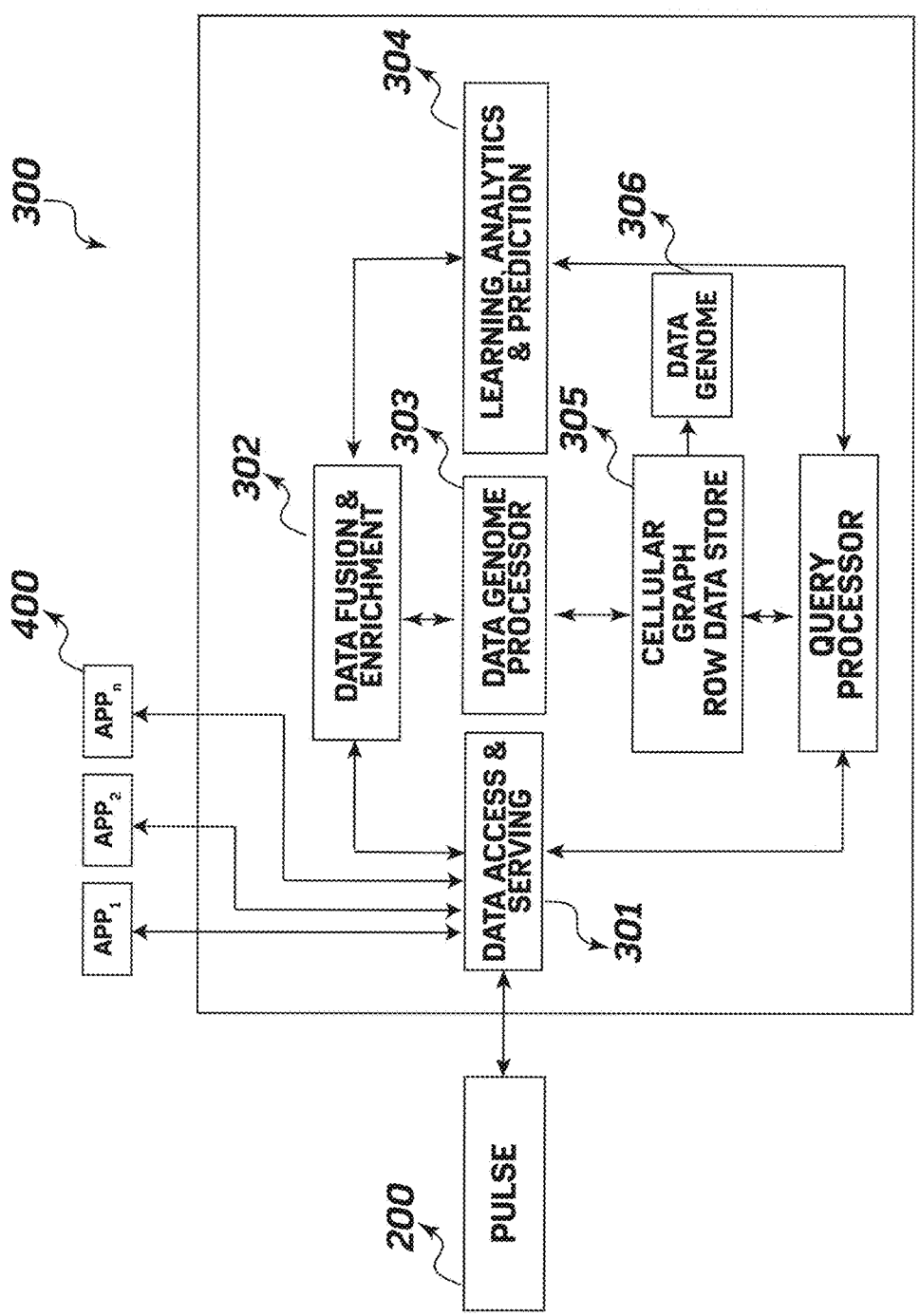
FIG. 6 is an exemplary functional block diagram of the edge cloud component according to an implementation consistent with the embodiments of the invention.

FIG. 6 is an exemplary functional block diagram of the edge cloud component according to an implementation consistent with the principles of the invention. Edge cloud 300 may include data access and serving component 301, data fusion and enrichment component 302, data genome processor 303, learning, analytics, and prediction component 304, cellular, graph, and row data storage component 305, data genome data structure 306, and one or more query processors 307 according to an implementation consistent with the principles of the invention. Data access and serving component 301 may receive requests and queries from pulse component 200 and/or know now augmented intelligence applications 400. Pulse component 200 and Know now augmented intelligence component 400 may communicate with data access and serving component 301 of the edge cloud 300 using exemplary REST API and messages encoded in JSON. However, pulse component may understand other communication protocols like standard protocols known in the industry like TCP/IP, XMPP, MQTT, and COAP and standard message formats like XML, CSV etc.

Figure 7:
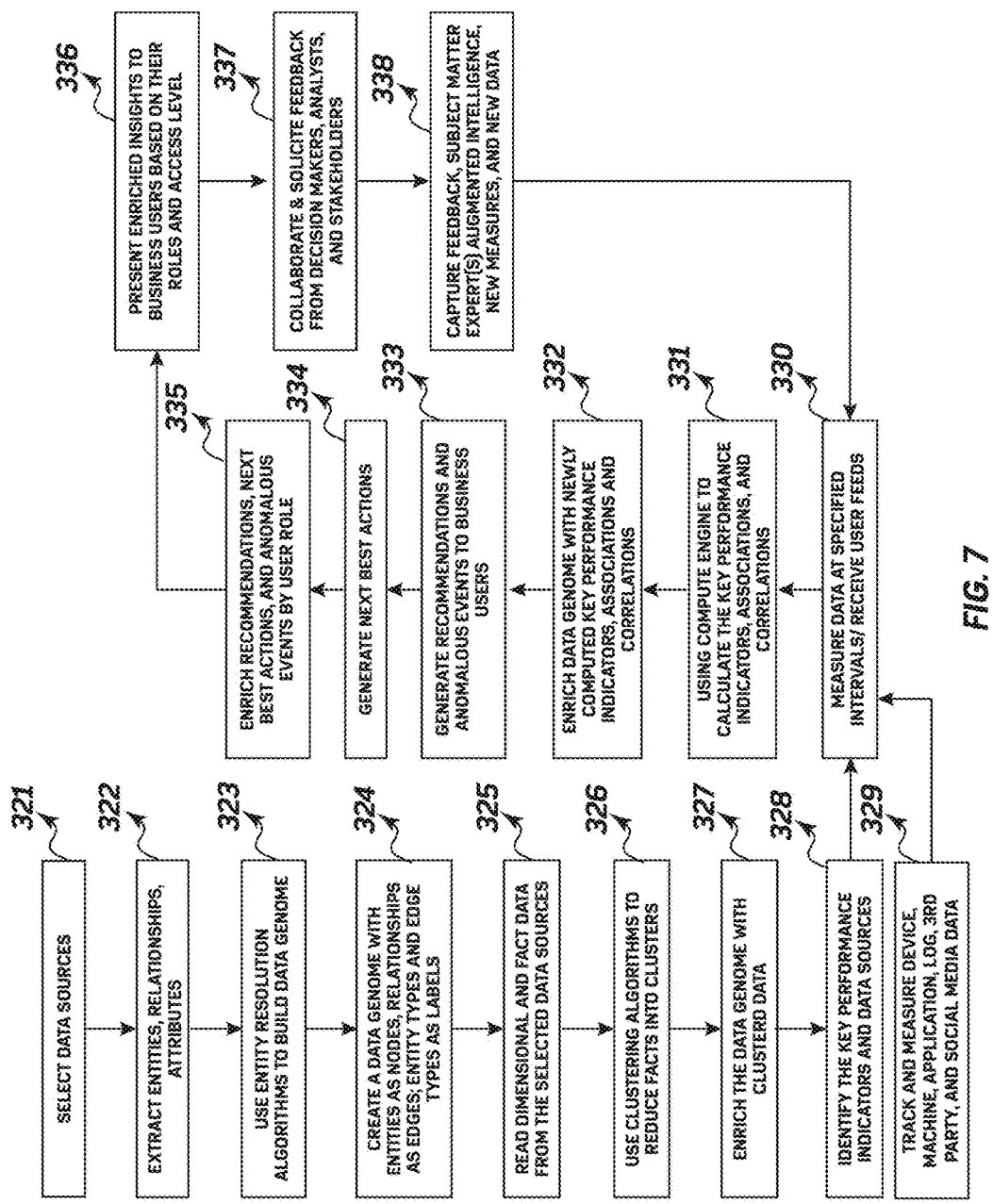
FIG. 7 is a flowchart of exemplary processing, storing, querying the data genome according to an implementation consistent with the embodiments of the invention.

FIG. 7 is a flowchart of exemplary processing, storing, querying the data genome according to an implementation consistent with the principles of the invention. As shown in the FIG. 7, the exemplary edge cloud implementation in consistent with the principles of this invention may perform select data sources 321 from the edge cloud data source 305; extract entities, relationships, and attributes 322; using entity resolution algorithms 323 to build data genome 306; create a data genome 306 with entities as nodes, relationships as edges, entity types and edge types as labels 324; read dimensional and fact data 325 from the data source 305; use clustering algorithms to reduce plurality of facts into similar groups or clusters 326; enrich the data genome 306 with the new insights derived from the clusters 327; identify the key indicators (KIs), data sources, and algorithms to compute the models 328; track, measure and enrich models 329 with alternate data 212, location and contextual data 213, and third party 214; measure data at specified intervals 330; using data fusion and enrichment component 302 to calculate the key indicators, measures, associations, and correlations 331, enrich data genome 306 with newly computed key indictors, measures, associations, and correlation scores 332; based on the insights and information available in the edge cloud data source 305 generate recommendations and anomalous events to business users 333; generate next best actions based on the location, contextual, user profiles, and roles 334; enrich the recommendations based on the information generated in 333 and 334 by use profiles and roles 335; deliver the role-based insights and information 336 to the business users 410a-410c via know now augmented intelligence apps 400; receive collaboration feedback and new information gathered from the business users 410a-410c using role-based micro-applications 400a-400c; and update the augmented intelligence 338 received from the business users 410a-410c.

Figure 8:
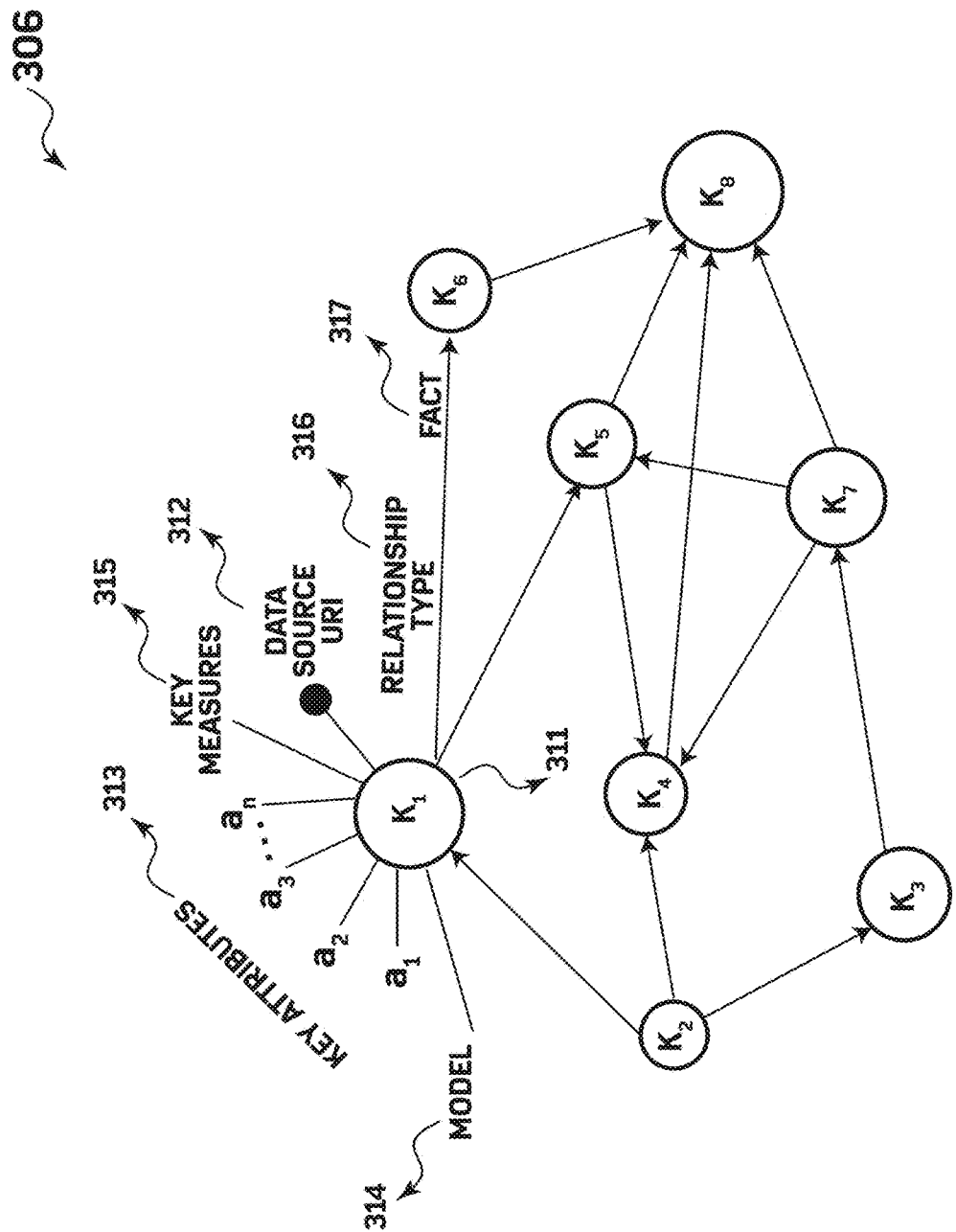
FIG. 8 is an exemplary diagram of a data genome and its components according to an implementation consistent with the embodiments of the invention.

FIG. 8 is an exemplary diagram of a data genome and its components according to an implementation consistent with the principles of the invention. As shown in FIG. 8, data genome 306 is realized as a semantic network of entities as nodes $K_1$-$K_8$, relationships and facts as edges in the network. Each node may contain attribute map a1-an, key measures 315, data source universal resource identifiers (uri) 312 and model 314 that describes the behavior of the entity computed using the historical and real time data sources 210. Each edge may capture relationship type 316, and facts 317.

Figure 9:
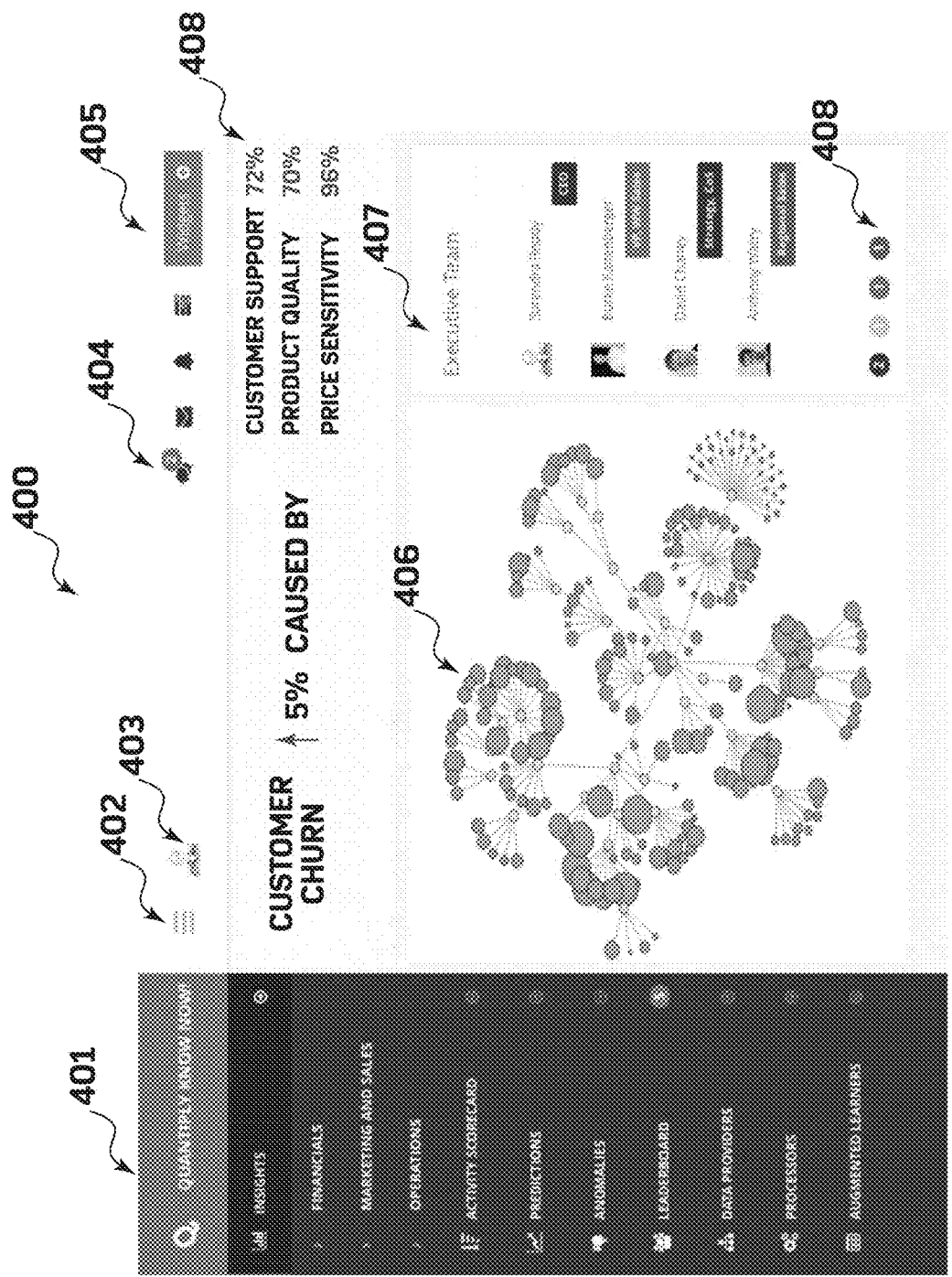
FIG. 9 is an exemplary diagram of a know now augmented intelligence app and its components according to an implementation consistent with the embodiments of the invention.

FIG. 9 is an exemplary diagram of a know now augmented intelligence app and its components according to an implementation consistent with the principles of the invention. Know Now Augmented Intelligence system 400 applies data visualization method known to the skilled professional to create dynamic, interactive views of genome clusters or specific personas and create what-if scenarios as they discover new knowledge or data during the business operations. Business users 410a, 410b, 410c in FIG. 1 and FIG. 2 may select a specific area of the data genome 306 in FIG. 8 to drill down further into the details. As in FIG. 9, details are personalized based on the business user role and profile information 410a-410c. For example, a marketing department might select from the data visualization the cluster of "fiction" and the persona of "wine" to create a subset of customers with these interests, then develop a highly customized marketing campaign targeted at individual customers. Businesses can also use a Know Now Augmented Intelligence system 400 to identify influencers, connections between customer genomes and the products that they like, such as clothing, music or books to create an automated offers that maximizes the financial outcome for the organization. These links can be the basis for developing recommendation strategies, as well as online or physical store layouts, to introduce selected genome clusters and individual customers to similar products. As shown in exemplary diagram in FIG. 9, in one embodiment, know now augment intelligence app 400 consists of, but not limited to, left menu bar with all options available 401 for the given business user role and profile 410a-410c; responsive menu option for devices with limited display area which is automatically detected by the app 400; user profile and account information 403; user specific communication tools 404; user defined widgets 405; genome map for the given role and scenario 406; collaboration channel for users 407; and recommendations and next best actions personalized for the given user 408. Know now augmented intelligence app 400 may be configurable by the business users 410a-410c.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for generating an enterprise data genome for an enterprise, the method comprising:
   identifying attributes, measures, and thresholds of enterprise entities, the identified attributes, measures and thresholds being related to financial, operational, and innovational outcomes of the enterprise;
   automatically extracting and contextualizing, using one or more of a plurality of software defined beacon systems based on a context in which each software defined beacon system is operating, the identified attributes and measures using measured enterprise data, each software defined beacon system including hardware and automatically scanning enterprise data sources based on a profile that specifies what to measure and at what interval to identify one or more relevant attributes, metrics, properties, key indicators (KIs) and key measures (KMs) components and creating an interest graph based on scanned data as part of contextualizing the identified attributes and measures;
   mapping the enterprise entities as nodes and one or more relationships between the enterprise entities as edges;
   creating contextual relevance scores for the enterprise entities and the one or more relationships between the enterprise entities as labels;
   connecting and automatically extracting ontologies of the enterprise entities;
   automatically creating the enterprise data genome as a semantic map using the enterprise entities as the nodes of the enterprise data genome, the one or more relationships between the enterprise entities as the edges of the enterprise data genome, and contextual relevance scores as the labels of the enterprise data genome, including determining unknown attributes of organizational behavior patterns of the enterprise, without a priori knowledge, that impact outcomes of enterprise performance by deriving hidden relationships among one or more of the identified attributes, measures and thresholds; and providing a data-visualization interface showing interactive views of genome clusters of the enterprise data genome in order for a user to navigate through the enterprise data genome and related genome data.

2. The method of claim 1, wherein the method is executed continuously against enterprise data sources.

3. The method of claim 1, wherein extracting the identified attributes and measures and creating contextual relevance scores are performed using machine learning to learn from historical data and to codify the knowledge into information.

4. The method of claim 1, wherein the identified measures comprise key performance indicators, and wherein the method further comprises aggregating the key performance indicators based on identified causal relationships and contextual intelligence.

5. The method of claim 1 wherein identifying the attributes, measures, and thresholds of enterprise entities is performed using statistical and artificial intelligence methods.

6. The method of claim 1 wherein the measured enterprise data from which attributes and measures are extracted and contextualized comprises historical data and real-time data.

7. An Enterprise Data Genome Engine (EDGE) system comprising:
a plurality of software defined beacon systems to automatically extract and contextualize, based on a context in which each software defined beacon system is operating, identified attributes and measures using measured enterprise data, each software defined beacon system including hardware and automatically scanning enterprise data sources based on a profile that specifies what to measure and at what interval one or more relevant attributes, metrics, properties, key indicators (KIs) and key measures (KMs) components and creating an interest graph based on scanned data as part of contextualizing the identified attributes and measures;
at least one memory;
at least one processor coupled to the at least one memory and coupled to receive information from the plurality of software defined beacon systems, wherein the at least one memory stores instructions that when executed by the at least one processor cause the at least one processor to function as:
a contextual analysis engine to mine an enterprise data set to identify patterns based on current and historical enterprise knowledge performance indicators (KPIs) and to extract contextual information from the identified patterns and information from the mined enterprise data set;
a statistical modeling engine to create contextual performance indicators based on the contextual information and pattern information including a temporal ordering of events, measurements, and performance measurement data;
a real-time recommendation engine to create contextual performance scores and measure key attributes and to evaluate the key attributes against business measures;
an augmented intelligence system to solicit and process feedback to update markers via labels, properties, and re-computed contextual performance scores; and
a real-time reality engine to deliver information to an end user using an enterprise data genome as a semantic map, the enterprise data genome being based on at least the contextual performance scores and including unknown attributes of behavior patterns of the enterprise that impact outcomes of enterprise performance, determined without a priori knowledge by deriving hidden relationships among one or more of the identified contextual performance indicators, contextual performance scores, and measure key attributes and to provide a data-visualization interface showing interactive views of genome clusters of the enterprise data genome in order for a user to navigate through the enterprise data genome and related genome data.

8. The system defined in claim 7 wherein the business measures are defined by one or more business users and a recommendation and learning engine.

9. The system of claim 7 wherein at least one of the software defined beacon system to measure, and report metrics and performance data associated with an enterprise.

10. The system of claim 9, wherein the software defined beacon system is operable to continuously monitor enterprise data sources.

11. The system of claim 7, wherein the real-time recommendation engine is operable with the augmented intelligence system to continuously measure, process feedbacks, and record newly discovered markers and contextual performance scores.

12. The system of claim 7, wherein the augmented intelligence system is operable to generate predictive models and receive feedback from subject matter experts or business users to further refine the predictive models.

13. The system of claim 7, wherein the real-time recommendation engine is operable to automatically learn and adjust one or more target variables associated with a key indicator (KI) based on the machine learning.

14. The system of claim 7, further comprising a remediation engine operable to generate a next best action to remedy affected key indicators (KIs).

15. A method comprising:
creating a data genome semantic network by automatically extracting and contextualizing using one or more of a plurality of software defined beacon systems based on a context in which each software defined beacon system is operating, identified attributes and measures using measured enterprise data, each software defined beacon system including hardware and automatically scanning enterprise data sources on a profile that specifies what to measure and at what interval to identify one or more relevant attributes, metrics, properties, key indicators (KIs) and key measures (KMs) components and creating an interest graph based on scanned data as part of contextualizing the identified attributes and measures;
receiving a search query;
performing a search to traverse a data genome semantic network for an enterprise, at least in part, on the search query to identify a group of search result key indicators (KIs) and dependent attributes, properties, and key measures, wherein the data genome semantic network is represented as a semantic map using enterprise entities as nodes of the data genome semantic network, with relationships between the enterprise entities as edges of the data genome semantic network, and contextual relevance scores as labels of the data genome;
determining trends and anomalies of a first set of KIs in a set of the search result KIs in the group based on date information;
generating a score for one or more search result KIs in the set of search result KIs, at least in part, on a difference between target values of the search result KIs and actual values of the search result KIs in the set of search result KIs; and ranking the search result KIs with regard to at least one other KI of the search result KIs based, at least in part, on the score;

determining unknown attributes of behavior patterns of the enterprise that impact outcomes of enterprise performance, without a priori knowledge, by deriving hidden relationships among one or more of the identified contextual performance indicators, contextual performance scores, and measure key attributes of the enterprise; and providing a data-visualization interface showing interactive views of genome clusters of the data genome semantic network in order to navigate through the data genome semantic network and related data.

16. The method defined in claim 15 further comprising:

determining a measure of how sentiments and mood of enterprise data associated with a KI changes over time;

generating a score for the KI based, at least in part, on a measure of how the attributes, measures, and trends associated with the KI changes over time; and ranking the KI with regard to at least one other KI based, at least in part, on the score.

17. A computer system comprising:

at least one memory;

at least one processor coupled to the at least one memory, wherein the at least one memory stores instructions that when executed by the at least one processor cause the at least one processor to function as:

a data fusion and enrichment component that processes one or more data sources to generate a plurality of datasets and data, the one or more data sources containing a plurality of entities, relationships, dimensional data, facts, associations, and attributes being part of metadata that describes data from which a data genome is generated, wherein one or more data genome components are located in a data store that also stores the data from which the data genome generated, wherein the data genome includes a plurality relationships and functions for processing and serving data genome component data, a contextual intelligence (CI) component that creates interest graphs based on the plurality of datasets and data generated by the data fusion and enrichment service, a data access and serving component operable to enable communication with the data genome to facilitate retrieval and query of the data genome component data, an enterprise data genome engine component to generate the data genome as a semantic map using information received from a plurality of software defined beacon systems that automatically extract and contextualize, based on a context in which each software defined beacon system is operating, the identified attributes and measures using measured enterprise data, each software defined beacon system including hardware and automatically scan enterprise data sources based on a profile that specifies what to measure and at what interval to identify one or more relevant attributes, metrics, properties, key indicators (KIs) and key measures (KMs) components and creating an interest graph based on scanned data as part of contextualizing the identified attributes and measures, and a learning, enrichment, analytics and prediction component to automatically predict, recommend, or infer possible attributes to be included in the data genome component and perform data enrichment to support predicted key indicators (KIs), the learning, enrichment, analytics and prediction component operable to determine unknown attributes of behavior patterns of the enterprise that impact outcomes of enterprise performance, without a priori knowledge, by deriving hidden relationships among one or more of the identified contextual performance indicators, contextual performance scores, and measure key attributes of the enterprise; and a display coupled to the at least one processor and memory and to provide a data-visualization interface showing interactive views of genome clusters of the data genome in order to navigate through the data genome and related genome data.

* * * * *